US007023612B2

(12) United States Patent
Ghera et al.

(10) Patent No.: US 7,023,612 B2

(45) Date of Patent: Apr. 4, 2006

(54) APPARATUS AND METHOD FOR UPGRADING A NARROW BAND OPTICAL COMMUNICATION SYSTEM TO A SYSTEM WITH WIDE SPECTRAL BAND OPTICAL AMPLIFICATION

(75) Inventors: Uri Ghera, Tel-Aviv (IL); Alex Shlifer, Rehovot (IL); David Menashe, Even-Yehuda (IL)

(73) Assignee: Red-C Optical Networking Ltd., Tel Aviv (IL)

( * ) Notice: Subject to any disclaimer, the term of this patent is extended or adjusted under 35 U.S.C. 154(b) by 0 days.

(21) Appl. No.: 11/066,204

(22) Filed: Feb. 28, 2005

(65) Prior Publication Data

US 2006/0018009 A1 Jan. 26, 2006

Related U.S. Application Data

(63) Continuation-in-part of application No. 10/893,882, filed on Jul. 20, 2004, now abandoned.

(51) Int. Cl.
*H01S 3/00* (2006.01)

(52) U.S. Cl. .................................................. 359/337.4

(58) Field of Classification Search ............ 359/337.4, 359/333, 341.1
See application file for complete search history.

(56) References Cited

U.S. PATENT DOCUMENTS 6,396,624 B1 * 5/2002 Nissov et al. ............ 359/341.1

* cited by examiner

*Primary Examiner*—Mark Hellner
(74) *Attorney, Agent, or Firm*—Mark M. Friedman

(57) ABSTRACT

An apparatus for optical amplification that imparts to a narrow band optical amplifier, specifically an Erbium dope fiber amplifier (EDFA), gain properties found in wide band optical amplifiers. In one preferred embodiment, the apparatus comprises an EDFA and an externally attachable (to the EDFA) module that includes a single un-pumped Erbium doped fiber (EDF) connected to a gain flattening filter (GFF). The GFF may be internal or external to the module. In another embodiment, the apparatus comprises an EDFA and an externally attachable module having a plurality of un-doped EDFs with different lengths, switchably connectable to the GFF and the EDFA to provide the required wide-band gain properties.

25 Claims, 9 Drawing Sheets a)

b)

Graph 7.1

Graph 7.2

Graph 7.3

Graph 7.4

Graph 7.5

Graph 7.6 a)

b)

APPARATUS AND METHOD FOR UPGRADING A NARROW BAND OPTICAL COMMUNICATION SYSTEM TO A SYSTEM WITH WIDE SPECTRAL BAND OPTICAL AMPLIFICATION

CROSS REFERENCE TO RELATED APPLICATIONS

The present application is a Continuation in Part of U.S. patent application Ser. No. 10/893,882, dated 20 Jul. 2004 now abandoned.

FIELD AND BACKGROUND OF THE INVENTION

The present invention relates to optical communication systems, and more particularly to amplifiers, specifically Erbium Doped Fiber Amplifiers (EDFA), used in Wavelength Division Multiplexing (WDM) optical communication systems.

EDFAs are used in WDM optical communication systems for amplifying many wavelength channels simultaneously in the Erbium doped fiber Gain band. There are two types of EDFAs for WDM: Fixed Gain (FG). optical amplifiers, which can be operated gain flattened and with low Noise Figure only at a pre-determined gain, as described for example in U.S. Pat. No. 5,225,922 to A. R. Charplyvy et. al; and Variable Gain (VG) amplifiers, which can be operated with low noise figure and gain flattened over wide range of gains, as described for example in U.S. Pat. No. 5,812,710 to Y. Seguya et al, U.S. Pat. No. 6,049,413 to M. G. Taylor et al., and U.S. Pat. No. 6,611,641 to U. Ghera et al.

Variable gain amplifiers are usually preferred in long distance systems that normally comprise a plurality of amplifiers, because usage of such an amplifier allows the user to operate the system with an overall low noise figure (NF). The drawback of these amplifiers is that they are much more complicated in their optical design, as discussed in the U.S. patents to Seguya, Taylor and Ghera above. Moreover, VG amplifiers are much more expensive than FG amplifiers. On the other hand, FG amplifiers, while inexpensive, suffer from a number of limitations, chiefly the fixed gain which causes non-optimal performance in a WDM systems based on a multiplicity of wavelengths.

There is thus a widely recognized need for, and it would be highly advantageous to have, WDM amplifiers and amplification systems that are inexpensive and simple like FG amplifiers, yet capable to endow the WDM system with the advantages of a VG amplifier, e.g. gain flattening over a wide range of gains.

SUMMARY OF THE INVENTION

According to the present invention there is provided an apparatus that includes a new type of amplifier for WDM optical communication systems. The new amplifier is based on the design and elements of a narrow band amplifier, specifically an EDFA, but comprises an additional component, a module that imparts to the amplifier gain properties found in wide band amplifiers. The module may be "passive" in the sense that it does not have an internal switching mechanism or "active" in the sense that it has such a mechanism. A passive module includes preferably an un-pumped Erbium doped fiber (EDF) connected to a gain-flattening filter (GFF). In one embodiment, the GFF is included in the passive module.

In another embodiment, the GFF is external to the passive module and incorporated in the EDFA.

In yet another embodiment, the module is "active" in that it includes a plurality of un-pumped EDFs with different lengths and a switching mechanism to connect one or more of the EDFs to the GFF and the EDFA to provide required wide-band gain properties.

In yet another embodiment, the module is "active" in that it includes a plurality of un-pumped EDFs with different lengths, each EDF directly connected in series to an associated optional GFF, and a switching mechanism used to select one or more EDFs and their associated optional GFFs for connection to another optional GFF and the EDFA to provide required wide-band gain properties.

In yet another embodiment, the module is connected in series with one or more additional gain stages to achieve a higher output power for the entire amplifier.

According to the present invention there is provided a method for operating a narrow band Erbium doped fiber amplifier (EDFA) as a wide band optical amplifier comprising the steps of connecting to the EDFA a module that includes at least one un-pumped EDF coupled to a GFF, and cooperatively operating the EDFA and the module to obtain wide band amplification with substantially flat gain.

According to one feature in the method of the present invention, the step of providing a module includes providing a passive module that includes one EDF.

According to another feature in the method of the present invention, the step of providing a module includes providing an active module that includes a plurality of EDFs of different lengths and a switching mechanism to select at least one of the EDFs for connection to the EDFA.

According to yet another feature in the method of the present invention, the step of providing a module includes providing an active module that includes a plurality of EDFs of different lengths, each EDF connected in series to an optional associated GFF, and a switching mechanism to select at least one of the pairs of EDF and their optional associated GFF for connection to the EDFA.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a new type of amplifier for WDM systems. This amplifier can be operated either as a variable gain amplifier with large dynamic range at a very narrow band spectrum (typically 1–3 nm), or as a fixed gain wide band amplifier (typically 40 nm). The transformation from a narrow band amplifier to a wide band one is done preferably by adding a passive module to the narrow band amplifier. An amplifier as disclosed herein allows an almost costless upgrading of a narrow band optical communications system to a wide-band optical communication system. It also reduces dramatically the number of amplifiers needed in the network.

The principles and operation of the combined amplifier according to the present invention may be better understood with reference to the drawings and the accompanying description.

Figure 1:
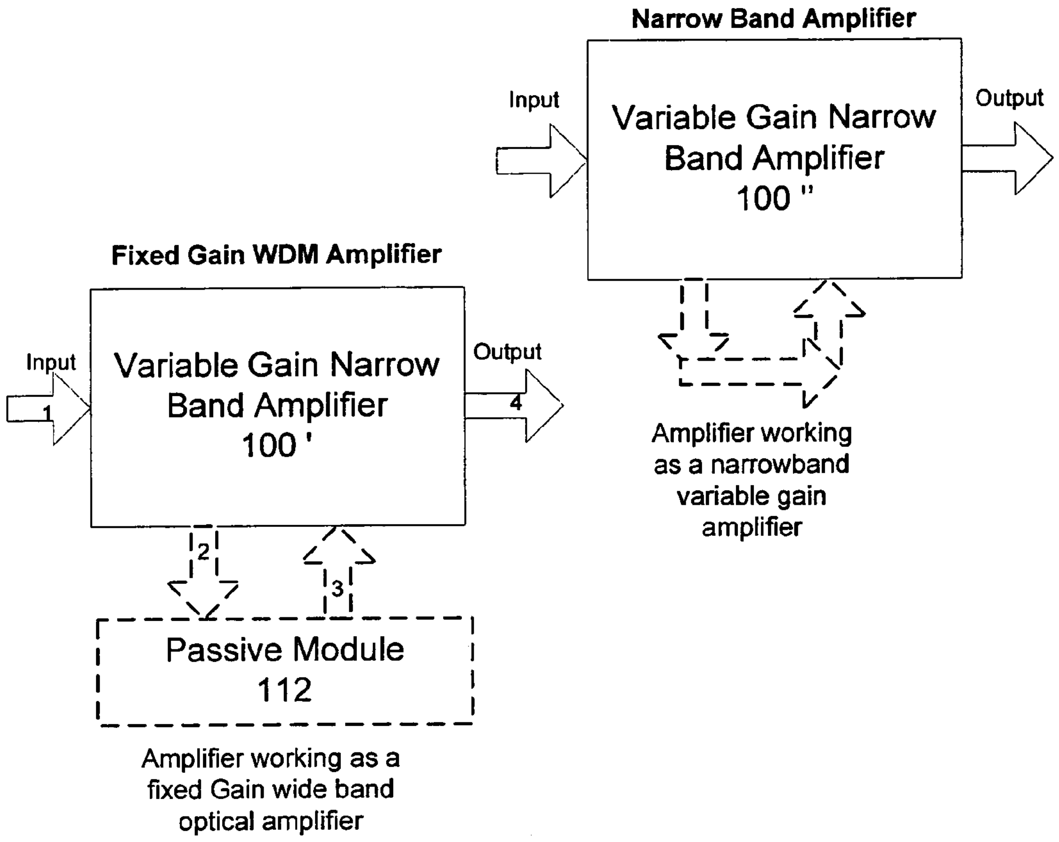
FIG. 1 shows schematically a variable gain narrow band amplifier.

Referring now to the drawings, FIG. 1 shows schematically a VG narrow band amplifier configured with a passive module 112 to perform as a fixed gain WDM amplifier 100' (left side), or shown in its regular configuration as a NB amplifier 100" on the right side. Arrows numbered 1 to 4 symbolize in this diagram fiber pigtails, where 1 and 4 are input and output pigtails, and 2 and 3 are pigtails that are short circuited as in 100", or pigtails connected to the passive module as in 100'. The adjustment from one setting (100"—without passive module) to another (100'—including passive module) may optionally be accomplished using an optical switching mechanism. Normally, amplifier 100" is a variable gain amplifier with a very narrow band; by adding to amplifier 100" a passive module as described in more detail below, amplifier 100" can be modified into a fixed gain amplifier at a requested gain. In a long distance WDM communication system, narrow band amplifiers can be located at amplification points/closets, and according to system topology an adequate passive module can be added to one or all such NB amplifiers so that each amplifier is gain flattened and has low noise at the exactly required gain.

The amplifier disclosed herein is comparable in building blocks simplicity to a fixed gain amplifier. However, systemwise it can deliver a noise figure comparable to a variable gain amplifier. It can work as a narrow band optical amplifier, and be reconfigured at any time to a fixed gain wideband amplifier just by adding a passive module, without changing amplifier software/hardware. The availability of such an amplifier has at least two major advantages: a) it reduces the types of amplifiers that system vendors have to keep, because one such amplifier fits all scenarios, and a system vendor needs therefore to stock only passive module boxes, and b) systems can be built with simple narrow band amplifiers in periods that traffic flow is low, and upgraded at a later stage as needs arise to wide band amplifiers.

Figure 2:
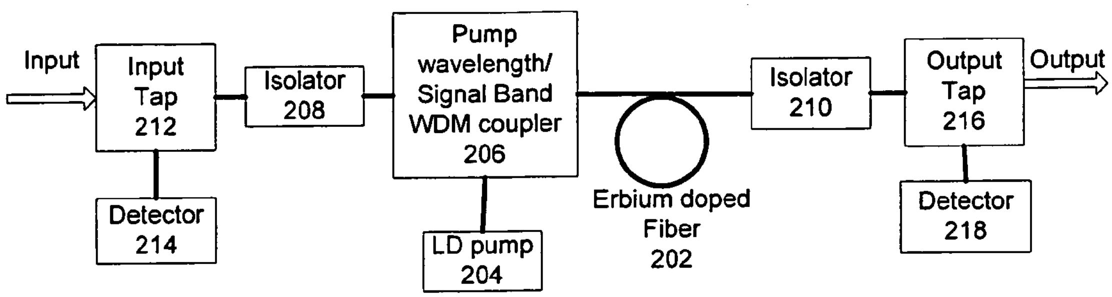
FIG. 2 shows details of a basic, standard Erbium doped fiber amplifier.

Reference is now made to FIG. 2, which shows details of a basic, standard EDFA. A basic EDFA comprises an Erbium doped fiber 202 pumped with either a 980 nm or a 1480 nm laser diode pump 204 via a pump wavelength/signal band WDM coupler 206. Isolators 208 (input) and 210 (output) are located on both sides of fiber 202, to prevent the optical amplifier from becoming a laser. An optical tap 212 and a detector 214 are usually located before the input isolator, i.e. between the input isolator and an "input" to the EDFA, and another tap 216 and another detector 218 are usually located after the output isolator, between the isolator and an "output" of the EDFA. With the knowledge of the level of input and output power it is possible to have information on the amplifier gain (Output power/input power), and it is possible to set the gain by varying the pump power, as described for example in "Erbium Doped Fiber amplifiers" by Emanuel Desurvire, J. Wiley and Sons, $1^{st}$ edition, 1994, chapter 5.2, pages 319–336.

The gain curve of a typical amplifier is wavelength dependent, and thus if it is required to operate the amplifier at a wide band (for example in the C band from 1527–1565 nm) a GFF is required, as described in U.S. Pat. No. 5,225,922 to A. R. Charplyvy et. al. A GFF is a pass-band filter with a transfer function complimentary to the gain curve of the EDF at a certain gain (population inversion), so superposition of both spectra results in constant gain for all wavelength channels passing through the amplifier. If the amplifier is operated at a narrow band (typically 1–3 nm) inside the Erbium gain band, wavelength gain variation becomes a non-issue and the amplifier can be operated over a very wide gain range (typically 10–20 dB).

Figure 3:
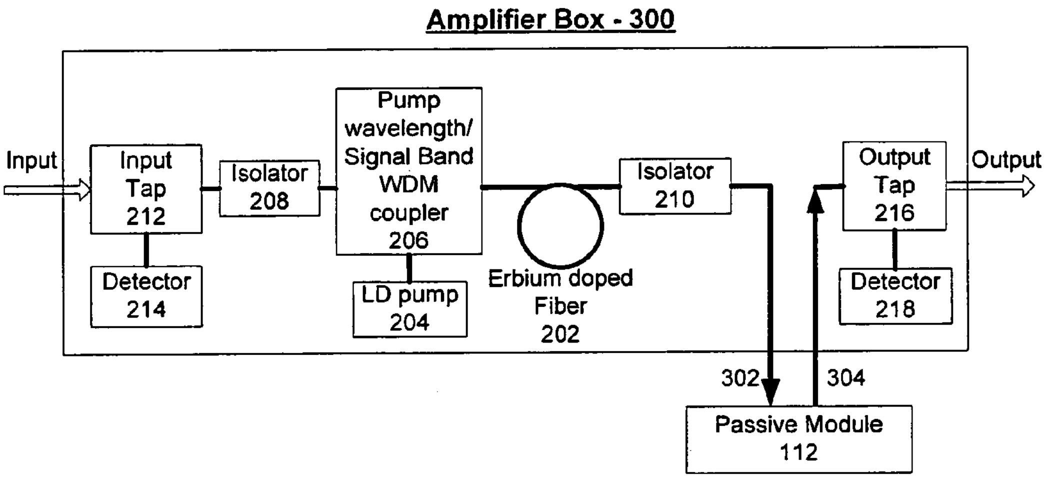
FIG. 3*a* describes a preferred embodiment of an amplifier according to the present invention.
FIG. 3*b* describes another embodiment of an amplifier according to the present invention.
Figure 3:
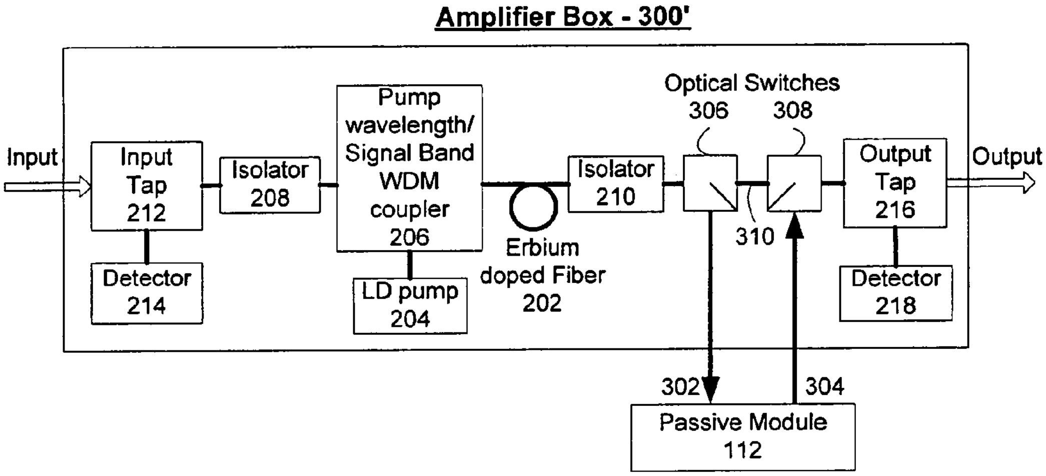

Reference is made now to FIG. 3*a*, which describes a preferred embodiment of an amplifier or "amplifier box" 300 (also referred to herein as an apparatus for optical signal amplification) according to the present invention. FIG. 3*a* shows all the elements of the basic EDFA of FIG. 2, and in addition a pair of optical cables 302 and 304 that connect the EDFA as shown to a passive module 112, which is described in more detail in FIG. 4. When amplifier 300 is required to be operated as a narrow-band amplifier, optical cables 302 and 304 are connected to each other (short circuited), and the passive module is not included in the optical path of the amplifier. When the amplifier is required to be operated as a wide band gain amplifier, optical cables 302 and 304 are connected to passive module 112, thus including the module within the optical path, and the amplifier can be operated gain flattened over a wide spectral band at the required gain.

FIG. 3*b* shows another embodiment of an amplifier box 300', which is identical to amplifier box 300 except for optical switches 306 and 303, and cable 310 inserted between the switches. When no passive module is connected to cables 302 and 304, switches 306 and 308 are configured to be connected to each other via cable 310. When a passive module is connected to cables 302 and 304, the switches can be reconfigured so as to include passive module 112 in the optical path of the amplifier. The use of a switching mechanism allows inclusion of passive module 112 within the optical path of the amplifier without communication traffic interruption. Note that switch 306 may be replaced with a passive optical splitter (not shown), or alternatively switch 308 may be replaced by a passive optical combiner (not shown). In either of these two latter cases, the switching mechanism is implemented using only a single optical switch.

Figure 4:
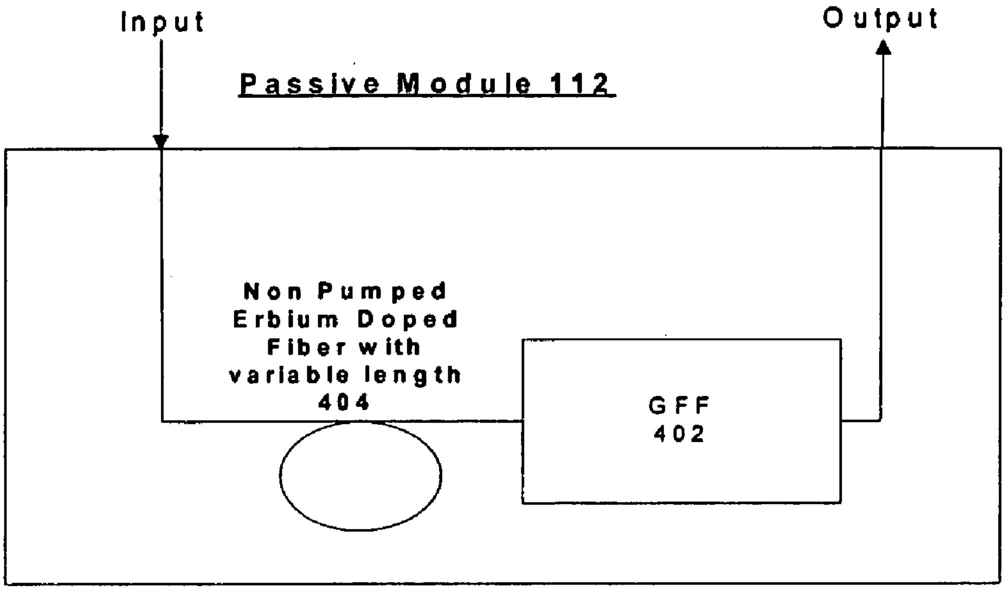
FIG. 4 shows a preferred embodiment of a passive module according to the present invention, comprising a gain flattening filter and an un-pumped Erbium fiber.
Figure 5:
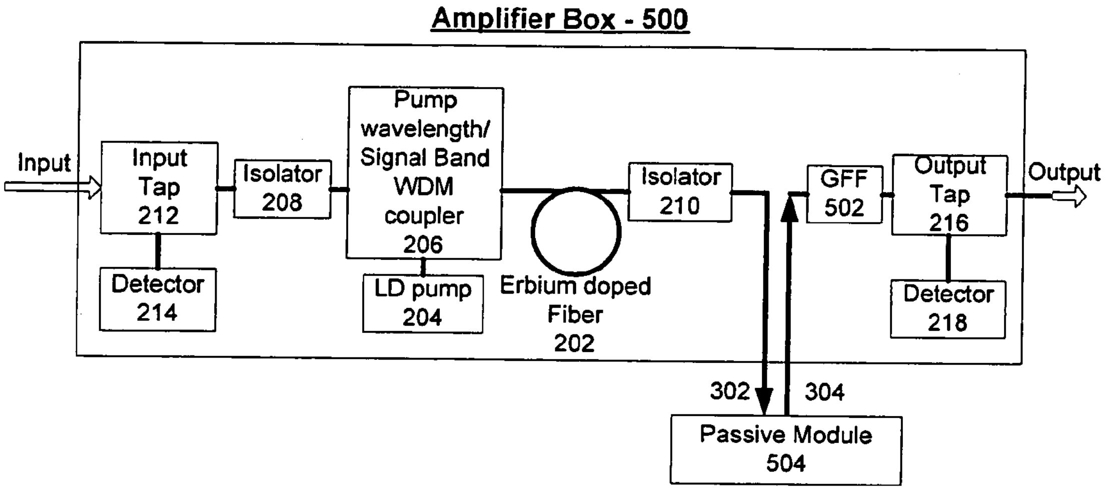
FIG. 5 shows an embodiment of an amplifier with a GFF designed for minimal gain incorporated in the EDFA.
Figure 6:
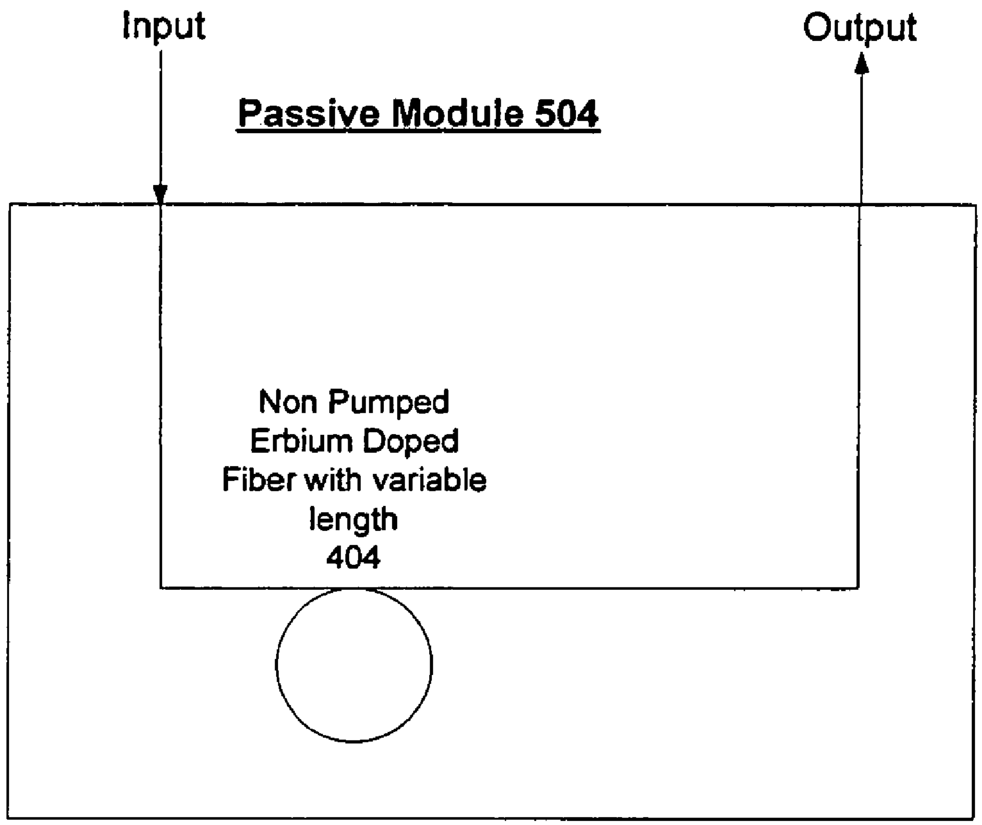
FIG. 6 shows a passive module embodiment that includes only an Erbium doped fiber of a given length, chosen to match a required gain when added to the amplifier of FIG. 5.

As shown in more detail in FIG. 4, the passive module preferably comprises a GFF 402 designed for the lowest gain that the single stage amplifier can be operated in, and an (un-pumped) EDF 404 whose length is dependent on the gain the amplifier has to be operated in. The function of the additional EDF is this embodiment is to absorb energy in the amplified spectrum in the blue band and to transfer it to the red band, thereby improving gain flattening. Alternatively, in another embodiment shown in FIG. 5, an amplifier 500 includes a GFF 502 for lowest gain incorporated in the EDFA itself. In this embodiment, a passive module 504 preferably includes only an un-pumped EDF (but no GFF), as shown in FIG. 6. The length of this un-pumped EDF may be changed according to the required gain (a change in length implying the use of a different passive module). In other words, different "EDF only" passive modules 504 may be prepared for different required gains, each such passive module having a fiber with a predetermined length that matches a required gain, and these modules may be changed and attached to the EDFA as needed. Amplifier 500 may be modified to include a switching mechanism in the form of one or more optical switches in the same manner as shown in FIG. 3*b*. This allows the addition of the passive module 504 without communication traffic interruption, as discussed in the context of FIG. 3*b* above.

The amplifier gain is related to a minimum gain through the length of this fiber; to obtain a higher amplifier gain in comparison with the minimal amplifier gain, one needs a longer EDF. For the C Band (1527–1565 nm), which is the most common spectral band used in optical communications, the un-pumped EDF has stronger absorption at shorter wavelengths, and operating the amplifier at higher gains than the GFF was designed for results in higher gains for the longer wavelengths. For this case, the passive module contains only an un-pumped EDF (and no GFF), as shown in FIG. 6. An example for the use and the performance of an amplifier according to the present invention is shown in FIG. 7.

Figure 7:
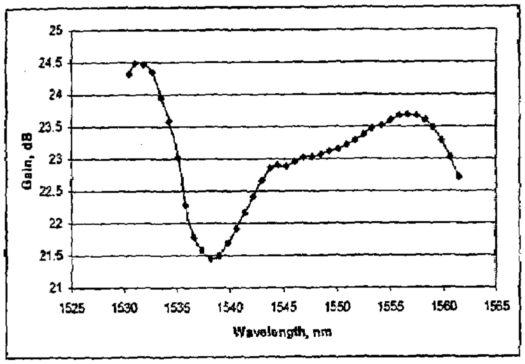
FIG. 7 shows exemplary performances of an amplifier according to the present invention, using a passive module with different un-pumped Erbium fiber lengths.
Figure 7:
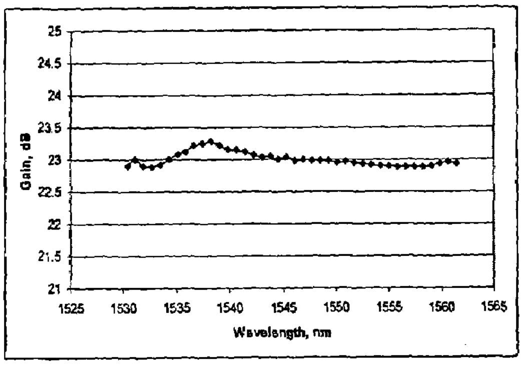
Figure 7:
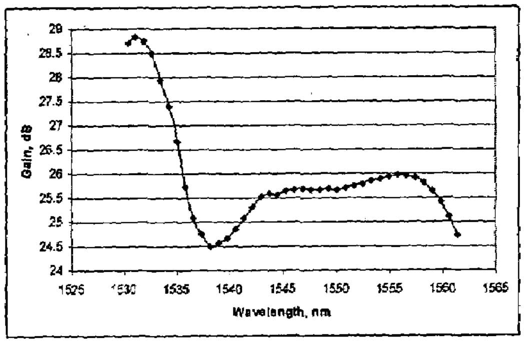
Figure 7:
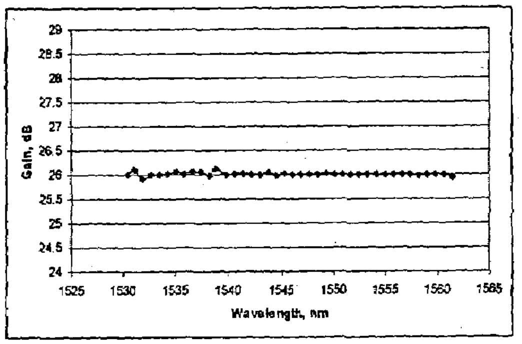
Figure 7:
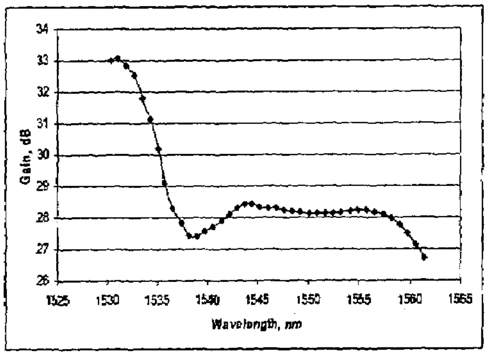
Figure 7:
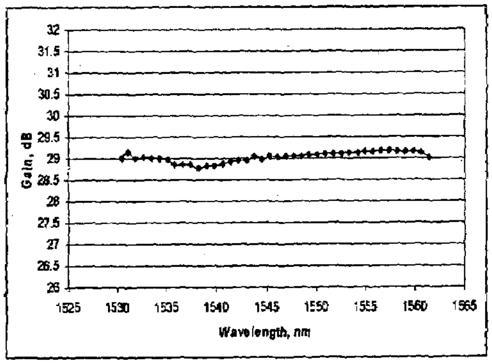

In FIG. 7, graph 7.1 shows the output spectrum of an EDFA comprising a 980 nm pump, a 10 meter long EDF and isolators and taps. A passive module is added and connected through cables as in the embodiment of FIG. 3 so that the amplifier is gain flattened for Gain=23 dB. In this case, the passive module comprises only a GFF (no un-pumped fiber, i.e. similar to the embodiment of FIG. 4, but with zero length of EDF 404)) and the result is shown in graph 7.2. In graph 7.3, the same amplifier is operated at Gain=26 dB. A passive module with the same GFF and additional 2 meters of an un-pumped EDF (as shown in FIG. 4) is added and connected through the same cables as above. The result is shown in graph 7.4. In graph 7.5, the same amplifier as in 7.1 is operated in Gain=29 dB. The same GFF as in graph 7.2 is used, but this time the passive module (comprising an internal GFF as in FIG. 4) includes 4.2 meters of EDF. The EDFA can thus be operated as a narrow band amplifier (1–3 nm) as described in graphs 7.1, 7.3 and 7.5. For narrow band operation, gain flattening is better than ±0.75 dB. If a wide band operation is required, the passive module is added (different for each gain) and the results are described in graphs 7.2, 7.4 and 7.6.

Figure 8:
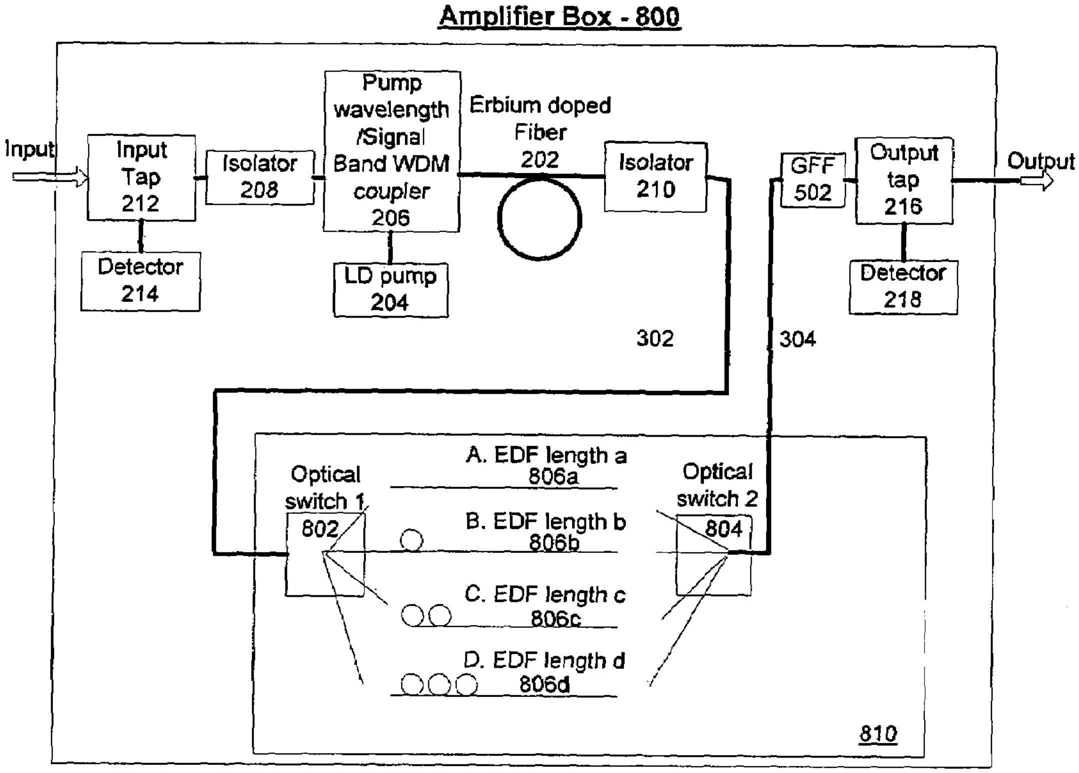
FIG. 8*a* shows an embodiment of an amplifier according to the present invention that uses an active module with a plurality of un-pumped EDFs of different lengths.
FIG. 8*b* shows an alternative embodiment of the active module used for the amplifier of FIG. 8*a;*
Figure 8:
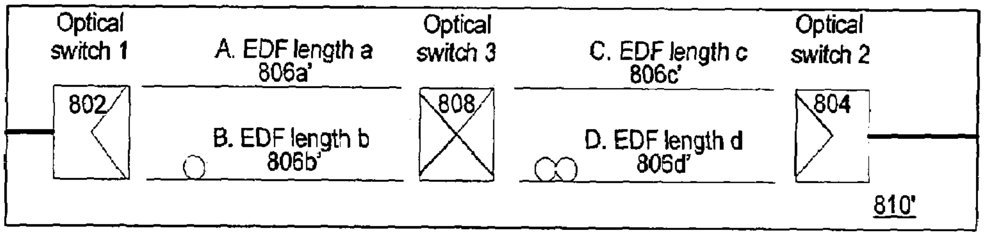

FIG. 8*a* shows an embodiment of an amplifier 800 according to the present invention that uses an "active module" with a plurality of un-pumped EDFs of different lengths. Amplifier 800 may be connected to an "active" module 810 that has a few pieces of EDFs with different lengths and two optical switches 802 and 804, which constitute a switching mechanism used to choose between the fibers, instead of adding manually an "EDF only" passive module as done in FIG. 5. The two optical switches are used to choose between different lengths of an EDF such as 806*a*, 806*b* 806*c* or 806*d*. A module that includes switches and different lengths of EDFs can be either incorporated in the amplifier or added as a separate entity to the amplifier. This addition transforms a narrow band amplifier (100' to 100" in FIG. 1) to a wideband VG EDFA. Gain variation is achieved by using an optical switch to choose the adequate length of EDF that will deliver gain flattening at the requested Gain.

FIG. 8*b* shows an alternative embodiment 810' of an active module. In this embodiment, an additional switch 808 may be used to configure the module for different combinations of EDF lengths, such as 806*a*'+806*c*', 806*a*'+806*d*', 806*b*'+806*c*', or 806*b*'+806*d*'. Additional switches and additional lengths of EDF may be used to achieve additional combinations.

In either of the embodiments of the active module (810 or 810'), an optional GFF (not shown) may be placed in series with each length of EDF. This may be used to achieve improved gain flatness for each possible configuration of the active module.

In either of the embodiments of the active module (810 or 810'), switch 802 may be replaced by a passive optical splitter (not shown), or switch 804 may be replaced by a passive optical combiner (not shown). In this way the switching mechanism may be achieved with one less active switch than shown in active module 810 or 810'.

Figure 9:
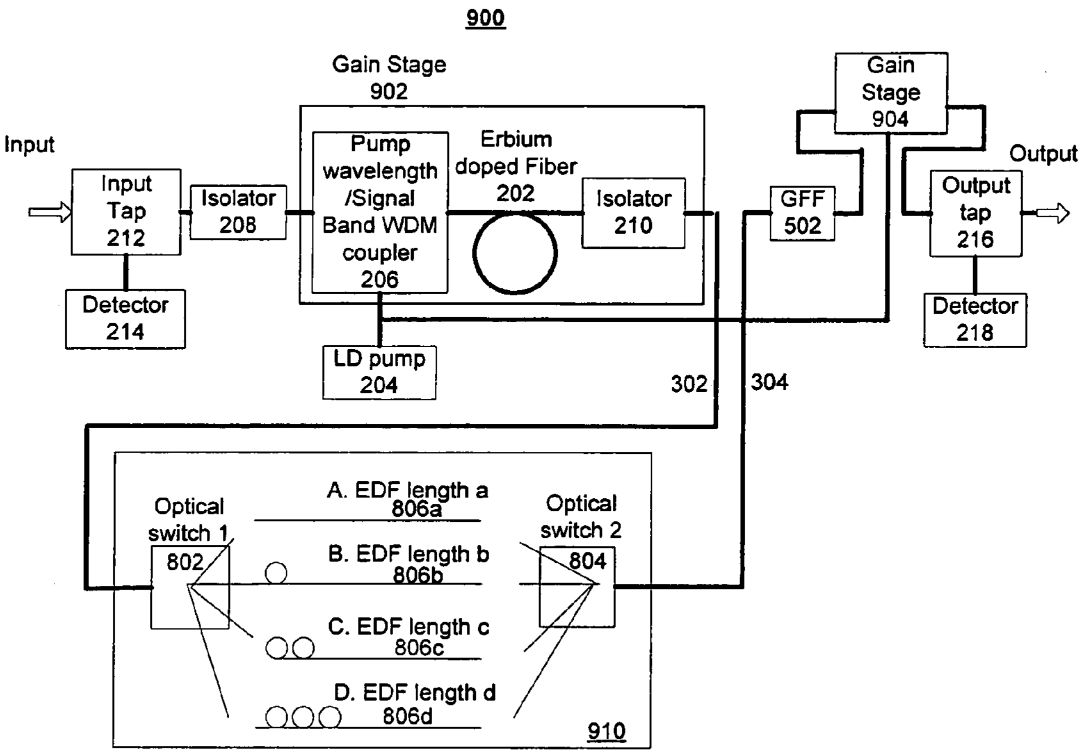
FIG. 9 shows yet another embodiment of an amplifier according to the present inventions, where the active or passive module is followed by one or more additional gain stages to achieve a higher output power.

FIG. 9 shows yet another embodiment of an amplifier according to the present invention, where the active module is followed by at least one additional gain stage. Amplifier 900 comprises a first gain stage 902 that includes some of the elements of FIG. 2, e.g. a Pump wavelength/Signal Band WDM coupler 206, an EDF 202 of a certain length and an isolator 210, and is connected to an active module 910. One or more additional gain stages 904, similar to first gain stage 902 can be used to compensate potential losses of the active module and GFF 502 and thus to reach a higher output power of the amplifier. The important aspect here is that module 910 is inserted between two gain stages that may be further connected to other amplifier elements. Alternative embodiments of the active module, as discussed in the context of FIG. 8 above, may be used instead of module 910.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

The invention claimed is:

1. An apparatus for optical signal amplification comprising:

a. an Erbium doped fiber amplifier (EDFA) component operative to act as a gain stage of a narrow band amplifier, said narrow band comprising substantially a single wavelength division multiplexed (WDM) channel or a single digit number of neighboring WDM channels, and b. a module connected to said EDFA component and operative to impart wide band gain properties to the apparatus for optical signal amplification [while]when used cooperatively with said EDFA.

2. The apparatus of claim 1, wherein said module is a passive module that includes at least one un-pumped Erbium doped fiber (EDF) having a respective length, said EDF connected in series with a gain flattening filter (GEE), whereby said wide band gain properties of the apparatus are correlated with said un-pumped EDF respective length.

3. The apparatus of claim 2, wherein said GFF is designed for the lowest gain that said gain stage should be operated in.

4. The apparatus of claim 2, wherein said GFF is included in said passive module.

5. The apparatus of claim 2, wherein said GFF is included in said EDFA component.

6. The apparatus of claim 2, wherein said EDFA includes a switching mechanism inserted in an optical path of said gain stage, said switching mechanism operative to switch said passive module in or out of said optical path.

7. The apparatus of claim 1, wherein said module is an active module with an input and an output, said active module including a plurality of un-pumped EDFs, each said EDF having a respective different fiber length, said active module further including a switching mechanism operative to select at least one of said un-pumped EDFs of said plurality for connection to said EDFA and a OFF.

8. The apparatus of claim 7, wherein said switching mechanism includes two optical switches, one each at said input and output of said active module.

9. The apparatus of claim 8, wherein one of said two optical switches is replaced by a passive optical coupler operative as an optical combiner or optical splitter.

10. The apparatus of claim 7, wherein each of said un-pumped EDFs may be connected directly in series with an optional respective individual GFF, and wherein said switching mechanism is operative to select at least one of the pairs of said un-pumped EDF and associated respective individual GFF for connection to said EDFA.

11. A method for operating a narrow band Erbium doped fiber amplifier (EDFA) as a wide band optical amplifier, the narrow band comprising substantially a single wavelength division multiplexed (WDM) channel or a single digit number of neighboring WDM channels, the method comprising the steps of a. connecting to the EDFA a module that includes at least one un-pumped Erbium doped fiber (EDF) coupled to a gain flattening filter (GFF); and b. cooperatively operating the EDFA and said module to obtain wide band amplification with substantially flat gain.

12. The method of claim 11, wherein said step of connecting to the EDFA a module that includes at least one un-pumped EDF coupled to a GFF includes connecting a passive module that includes at least one un-pumped Erbium doped fiber (EDF) having a respective length, said at least one un-pumped EDF connected in series with said GFF, whereby said wide band amplification with substantially flat gain is correlated with said respective length.

13. The method of claim 12, wherein said connecting a passive module that includes at least one un-pumped EDF having a respective length coupled to a GFF further includes providing a GFF designed for the lowest gain of a range of gains that the amplifier can be operated in.

14. The method of claim 12, wherein said connecting of a passive module that includes at least one un-pumped EDF having a respective length coupled to a GFF includes having said GFF positioned inside said module.

15. The method of claim 12, wherein said connecting of a passive module that includes at least one un-pumped EDF having a respective length coupled to a GFF includes having said GFF inside said EDFA.

16. The method of claim 11, wherein said step of connecting to the EDFA includes providing a module comprising a plurality of un-pumped EDFs, each said EDF having a respective different fiber length and two switches operative to select a particular said un-pumped EDF of said plurality for connection to said EDFA and said GFF.

17. The method of claim 16, wherein said providing a module comprising a plurality of un-pumped EDFs, each said EDF having a respective different fiber length and two switches includes providing a module in which one of said two switches is replaced by a passive optical coupler.

18. The method of claim 11, wherein said step of connecting to the EDFA a module that includes at least one un-pumped EDF coupled to a GFF includes:

i. providing a module comprising a plurality of un-pumped EDFs each having a respective different fiber length and each connected in series with an optional individual GFF, and ii. providing a switching mechanism operative to select at least one of said un-pumped EDFs together with its corresponding optional individual GFF for said connecting.

19. An apparatus for optical signal amplification comprising:

a. an Erbium doped fiber amplifier (EDFA) component operative to act as a gain stage of a narrow band amplifier, said narrow band comprising substantially a single wavelength division multiplexed (WDM) channel or a single digit number of neighboring WDM channels;

b. at least one un-pumped Erbium doped fiber (EDF) having a respective length and connected to said EDFA; and c. a gain flattening filter (GFF) associated with a gain stage and connected in series with said at least one un-pumped EDF and said EDFA, whereby the combination of said at least one EDF and said GFF impart wide band gain properties to the apparatus for optical signal amplification while used cooperatively with said EDFA.

20. The apparatus of claim 19, wherein said GFF is designed for the lowest gain that said gain stage should be operated in.

21. The apparatus of claim 20, wherein said at least one un-pumped EDF and said GFF are included in a separate passive module operative to be attached to and removed from said EDFA as a single unit.

22. The apparatus of claim 20, wherein said GFF is included in said EDFA and wherein said at least one un-pumped EDF is included in a separate passive module externally attachable to said EDFA.

23. The apparatus of claim 20, wherein said at least one un-pumped EDF includes a plurality of un-pumped EDFs each having a respective different fiber length, and wherein the apparatus further includes a switching mechanism operative to select at least one of said un-pumped EDFs of said plurality for connection to said EDFA and said GFF.

24. The apparatus of claim 23, wherein each of said un-pumped EDFs may be connected directly in series with an optional respective individual GFF, and wherein said switching mechanism is operative to select at least one pair of said un-pumped EDF and associated respective individual GFF for connection to said EDFA.

25. The apparatus of claim 19, further comprising at least one additional gain stage connected in series with said EDFA, said at least one un-pumped EDF, and said GFF.

* * * * *